April 23, 1957

A. POUPON 2,790,138

INDUCTION WELL LOGGING

Filed Aug. 9, 1955

INVENTOR.
ANDRÉ POUPON.

BY

HIS ATTORNEY.

April 23, 1957 A. POUPON 2,790,138
INDUCTION WELL LOGGING
Filed Aug. 9, 1955 2 Sheets-Sheet 2

INVENTOR.
ANDRÉ POUPON.
BY
HIS ATTORNEY.

United States Patent Office 2,790,138
Patented Apr. 23, 1957

2,790,138

INDUCTION WELL LOGGING

Andre Poupon, Ridgefield, Conn., assignor, by mesne assignments, to Schlumberger Well Surveying Corporation, Houston, Tex., a corporation of Texas Application August 9, 1955, Serial No. 527,187

8 Claims. (Cl. 324—6)

The present invention relates to induction well logging, and more particularly to new and improved electromagnetic apparatus for obtaining indications of the electrical conductivity of the earth formations traversed by a borehole.

It has become accepted oil field practice to determine the electrical conductivity of earth formations by utilizing induction logging systems which incorporate the highly effective focusing techniques disclosed in Patent No. 2,582,314, issued January 15, 1952, to H. G. Doll for "Electromagnetic Well Logging System" and Patent No. 2,582,315, issued January 15, 1952, to H. G. Doll for "Differential Coil System for Induction Logging." The present invention relates to induction well logging apparatus utilizing focusing techniques which reduce substantially to zero the sensitivity of the apparatus to variations in the conductivity of material above and below predetermined levels, i. e., vertical focusing.

Accordingly, it is an object of the present invention to provide new and improved induction well logging apparatus for obtaining indications of the conductivity of the earth formations traversed by a borehole.

Another object of the present invention is to provide new and improved induction well logging apparatus in which the response therefrom is limited in vertical extent.

These and other objects of the invention are attained by providing at least two separate coil systems in a logging array adapted to be passed through a borehole, each coil system comprising a transmitter coil and a receiver coil. The coils are disposed coaxially and are spaced apart vertically along the logging array. The two coils in one of the coil systems are symmetrically arranged respectively above and below the spaced apart coils in the other system. The transmitter coil in each system is energized with alternating current having a distinguishing characteristic in time or frequency that permits the response of each coil system to be detected independently of the presence of the other system. The response of one coil system is subtracted from the response of the other, and this combined response is substantially unaffected by variations in the conductivity of material above and below the outermost coils. If desired, additional coil systems may be employed to provide lateral as well as vertical focusing.

The invention will be more fully understood with reference to the accompanying drawings in which.

Figure 1:
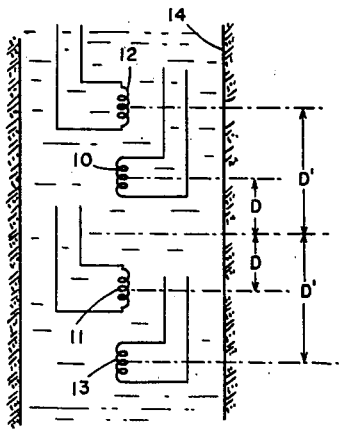
Fig. 1 is a schematic diagram of two coil systems in a borehole, utilized to explain some of the principles of the invention.

In Fig. 1, four coils 10, 11, 12 and 13 are shown disposed coaxially along a borehole 14. Coils 10 and 11 comprising a first coil system are spaced vertically apart by a distance 2D. Coils 12 and 13 comprising a second coil system are disposed symmetrically above and below coils 10 and 11 and are vertically spaced apart by a greater distance 2D'. Assume for the moment that coils 12 and 13 are not activated and that coil 10 is energized by alternating current of intensity $I_1$ and frequency $f_1$. Under these conditions a voltage of frequency $f_1$ is induced in coil 11. That component of the voltage of frequency $f_1$ induced in coil 11 that is in phase with the current in coil 10 is detected as a function of conductivity.

Figure 2:
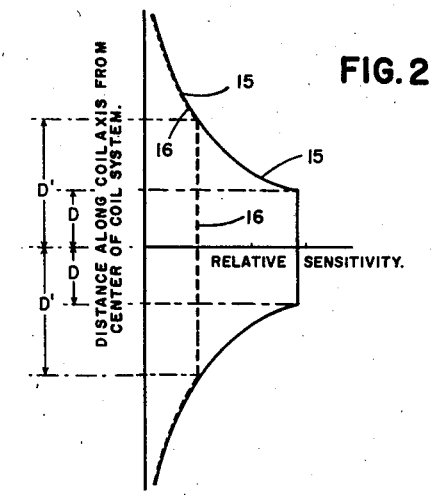
Fig. 2 is a graph illustrating typical vertical sensitivity curves for the coil systems shown in Fig. 1.

A typical plot of the vertical (or longitudinal) sensitivity of a two-coil system comprising coils 10 and 11 is shown by curve 15 in Fig. 2. It can be seen that while the system 10—11 is most sensitive in the region between coils 10 and 11, nonetheless it has substantial sensitivity to material up and down the bore hole. Details for determining the signal response induced by the formation in any two-coil system are given in an article entitled "Introduction to induction logging and application to logging of wells drilled with oil base mud" by H. G. Doll Transactions, AIME, volume 186, page 148, 1949, and in the aforementioned Patents Nos. 2,582,314 and 2,582,315 to H. G. Doll.

Assume now that coils 10 and 11 are de-activated and that coil 12 is energized with alternating current of intensity $I_2$ and of frequency $f_2$. Under these conditions, that component of the voltage of frequency $f_2$ induced in coil 13 that is in phase with the current in coil 12 is detected as a function of conductivity. If in accordance with the present invention the effective areas of coils 10, 11, 12 and 13 are the same, and $$f_1^2 I_1 = f_2^2 I_2 \tag{1}$$

the sensitivity for the system comprising coils 12 and 13 relative to system 10—11 is given by curve 16 in Fig. 2. It can be seen that above and below coils 12 and 13, the sensitivity curves 15 and 16 are coincident, while between such coils curve 16 is of smaller value than curve 15. Thus by subtracting the conductive response of coil system 12—13 from the conductive response of system 10—11, this combined response will be insensitive to material above and below coils 12 and 13, while the combined sensitivity will be the difference between the two curves 15 and 16 within the distance 2D'.

More generally, theoretically perfect focusing as shown in Fig. 2 will be obtained in accordance with the invention with two two-coil systems when $$S_{10}S_{11}f_1^2 I_1 = S_{12}S_{13}f_2^2 I_2 \tag{2}$$

where $S_{10}$, $S_{11}$, $S_{12}$, and $S_{13}$ are the effective areas of coils 10, 11, 12 and 13, respectively. If as is usually the case the diameters of all coils are the same, Relation 2 may be simplified as follows:

$$N_{10}N_{11}f_1^2 I_1 = N_{12}N_{13}f_2^2 I_2 \tag{3}$$

where $N_{10}$, $N_{11}$, $N_{12}$, and $N_{13}$ are the number of turns in coils 10, 11, 12 and 13 and 14 respectively.

Figure 3:
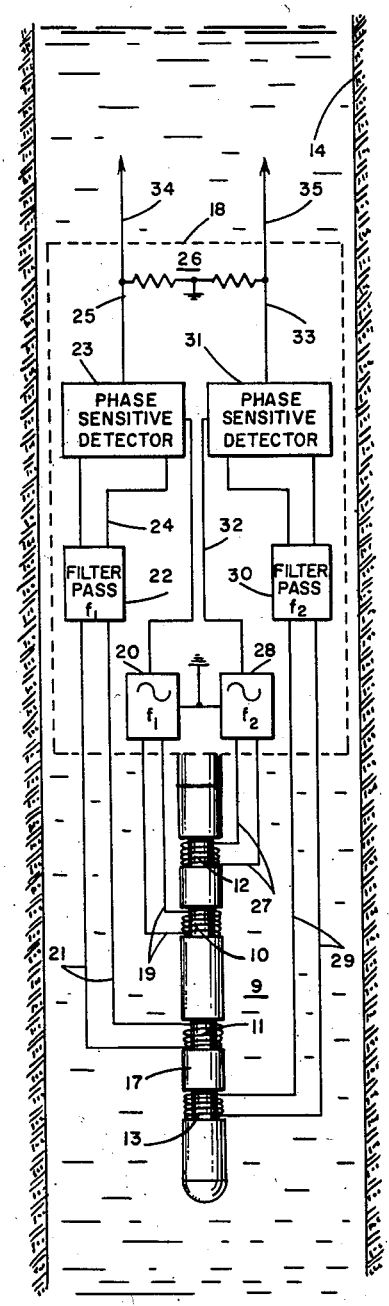
Fig. 3 illustrates typical apparatus constructed in accordance with the invention.

More detailed apparatus for carrying out the invention in accordance with the foregoing princples is shown in Fig. 3. In Fig. 3, induction logging apparatus 9 is disposed in borehole 14 which may or may not be filled with drilling mud. Apparatus 9 may comprise a non-conductive, non-magnetic mandrel or sonde 17 which supports the four coils 10, 11, 12 and 13, and a pressure-resistant cartridge 18 adapted to contain the necessary down-hole electrical equipment. Apparatus 9 is adapted to be passed through the borehole by means of a conventional electric cable and winch combination (not shown) which are also used to transmit the necessary power from the surface of the earth to apparatus 9, and to transmit the response of the apparatus 9 to the surface for recording in the usual manner.

Coils 10, 11, 12 and 13 are spaced on mandrel 17 in the manner described in connection with Figs. 1 and 2. Transmitter coil 10 is connected by means of insulated conductors 19 to a source 20 of alternating current of frequency $f_1$. Receiver coil 11 is connected by insulated conductors 21 through a band pass filter 22 passing signals of frequency $f_1$ to a phase sensitive detector 23. Phase sensitive detector 23 receives a sensitizing signal via conductor 24 from source 20. Detector 23 is adjusted to give a D. C. output proportional to any voltage induced in coil 11 at frequency $f_1$ that is in phase with the current of frequency $f_1$ in coil 10. The output 25 of detector 23 is applied to a subtracting network 26.

Transmitter coil 12 is connected by conductors 27 to a source of alternating current 28 of frequency $f_2$. Receiver coil 13 is connected by means of conductors 29 to a filter 30 passing only signals of frequency $f_2$ from the receiver coil 13. The output of filter 30 is connected to a phase sensitive detector 31 which is sensitized by a signal from the source 28 on conductor 32. Phase sensitive detector 31 is adjusted to give a D. C. output proportional to the voltage induced in coil 13 at frequency $f_2$ that is in phase with the current of frequency $f_2$ passing through coil 12. The output 33 of detector 31 is applied across subtracting network 26. Thus there appears between conductors 34 and 35 in the output of subtracting network 26 a signal representing the difference in the response of coil system 10—11 and coil system 12—13. By constructing the coils 10, 11, 12 and 13, and adjusting frequencies $f_1$ and $f_2$ along with the intensities of current passing through coils 10 and 12, all in accordance with Relation 2 above, or in accordance with Relations 1 or 3 above, this combined response will be a function of the conductivity of the material surrounding sonde 17 between horizontal planes intersecting coils 12 and 13 to the exclusion of any sensitivity or response to the material above coil 12 below coil 13. Thus as apparatus 9 is passed through the borehole, a continuous record is made of the conductivity of the material surrounding sonde 17, the record being insensitive to variations in the conductivity of material above and below coils 12 and 13 respectively.

Figure 4:
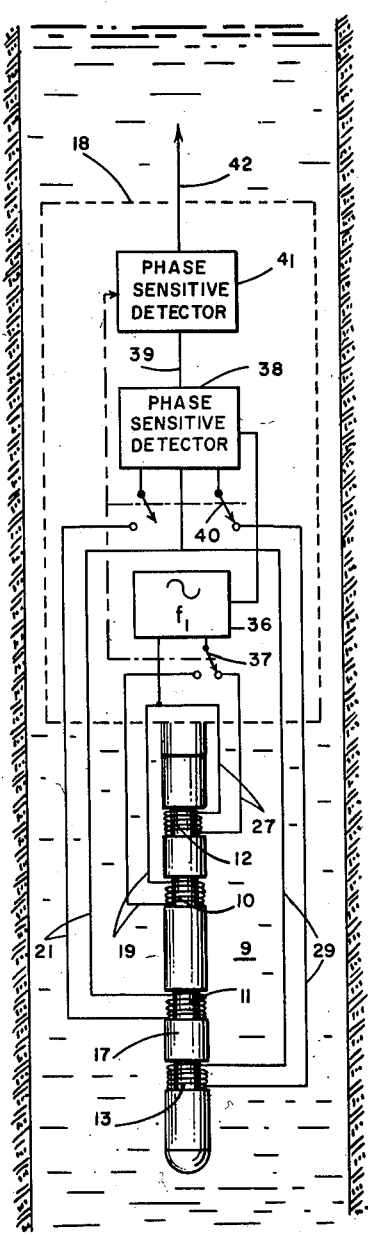
Fig. 4 illustrates still further apparatus that may be employed in accordance with the invention.

In Fig. 4 is disclosed another type of appartaus that may be employed in accordance with the invention. In this modification, current of the same frequency activates the transmitter coils of both systems. However, the systems are activated sequentially so that first the response of one system at frequency $f_1$ is detected and then the response of the other system at frequency $f_1$ is detected as the sonde 17 is moved through the borehole. Thus electronic cartridge 18 contains a source of current 36 which is connected sequentially to transmitter coils 10 and 12 by means of an electronic switch 37 shown schematically in Fig. 4. The output of coil 11 is applied to a balanced phase sensitive detector 38 during the period when coil 10 is activated by source 36. The output of coil 13 is applied to detector 38 during the period when transmitter coil 12 is activated by current source 36. Signals in the output of coil 11 give D. C. signals of one polarity in the output 39 of detector 38 while signals in the output of coil 13 give D. C. signals of the opposite polarity in the output 39 since switch 40, which is synchronized with switch 37, applies the outputs of coils 11 and 13 to detector 38 in oppositely phased relation. This output 39 is fed to a second phase sensitive detector 41 which is sensitized at the frequency of switches 37 and 40, and the variations in the amplitude in the output 42 of detector 41 represent the difference in responses of coil systems 12—13 and 10—11.

In connection with the apparatus shown in Figs. 3 and 4 a continuous recording at the surface of the earth is made while the sonde 17 is moved through the borehole. As shown above, this will give a continuous measurement of the conductivity of the material in the zone between coils 12 and 13. However, since conductivity is the reciprocal of resistivity, if desired, the resistivity may be recorded simultaneously with or in lieu of conductivity. A convenient device for translating conductivity to resistivity is shown in copending application Serial No. 293,146, filed June 12, 1952, by K. A. Bilderback. While in Figs. 3 and 4 simple phase sensitive detecting apparatus has been disclosed, in practice it is preferable to use systems of the type disclosed in copending application Serial No. 750,307, filed May 24, 1947, for "Phase Rejection Networks" by H. G. Doll. In addition to the types of systems shown generally in Figs. 3 and 4, the apparatus shown in Fig. 7 of copending application Serial No. 339,573, filed March 2, 1953, by N. A. Schuster for "Induction Logging Apparatus" may be conveniently employed to sequentially activate the two coil systems and to subtract the desired portion of their responses.

While in the above arrangements two two-coil systems, each comprising a transmitter and receiver coil, are employed, it is possible in accordance with the present invention to obtain vertical focusing using one or more additional systems, each comprising a transmitter and a receiver coil placed symmetrically about a first and a second coil system, provided that the following relation is satisfied:

$$\sum_n S_n S_n' f_n^2 I_n = 0 \qquad (4)$$

where $f_n$ is the frequency of the current energizing the $n$th coil system, $I_n$ is the intensity of current in the $n$th system, $S_n$ is the effective area of the transmitter coil in the $n$th system and $S_n'$ is the effective area of the receiver coil. In Relation 4, the negative sign that will appear on one or more of the terms merely means that the responses of the two-coil systems represented by such terms must be subtracted from the responses of the remaining systems. Of course, Relation 4 is the general relation from which Relations 1, 2 and 3 are derived. If the diameters of all the coils are the same, the area factors in Relation 4 may be replaced by the number of turns in the coil in question.

By utilizing three or more sets of transmitter and receiver coils spaced symmetrically as indicated above and satisfying Relation 4 above to give vertical focusing, it is further possible to reduce the response from material in the vicinity laterally of the coil systems provided that the following relation is satisfied:

$$\sum_n \frac{S_n S_n' f_n^2 I_n}{D_n^3} = 0 \qquad (5)$$

where the distance $D_n$ is one-half separation distance between the transmitter and receiver coils of the $n$th two-coil system. Thus by following both Relations 4 and 5 and utilizing three or more two-coil systems it is possible to obtain theoretically perfect vertical focusing and greatly improved lateral focusing. Of course, regardless of the number of two-coil systems employed, each must be electrically separated from the remainder either in frequency or time so that the response from each system is unaffected by the presence of the remaining systems. When time separation is employed, a constant current, constant frequency source may be sequentially connected to the transmitter coils, and thus the $f_n^2 I_n$ portion of Relations 4 and 5 may be dropped.

Figure 5:
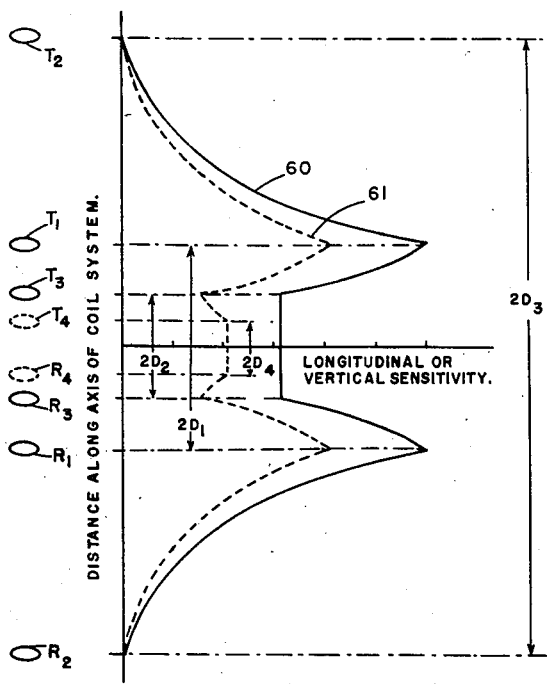
Figs. 5, 6 and 7 are graphs of the sensitivity characteristics of various embodiments of the invention.
Figure 6:
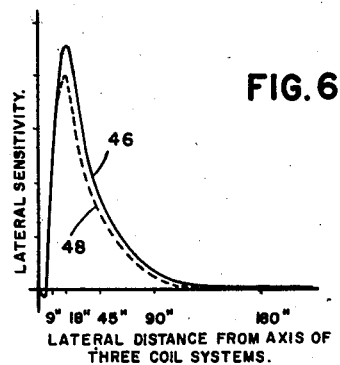

As an example of the improved vertical and lateral sensitivity characteristics obtained in accordance with the invention by utilizing Relations 4 and 5 above, typical sensitivity curves are given in Figs. 5 and 6. In Fig. 5 there are shown disposed along the vertical axis three coil systems $T_1 R_1$, $T_2$, $R_2$, and $T_3$, $R_3$. If we assume that the diameters of all coils are the same, as would normally be the case, and that the product of the frequency squared and the intensity of the current applied to each transmitter coil has the same numerical value for $T_1$, $T_2$ and $T_3$, the solid curve 60 in Fig. 5 gives the vertical sensitivity characteristic for the three two-coil systems, where $R_1=T_1=100$ turns, $R_2=T_2=93.75$ turns, $R_3=T_3=34.8$ turns, $D_1=30$ inches, $D_2=90$ inches, and $D_3=15$ inches. Frequencies below 20 kc. are recommended.

Figure 7:
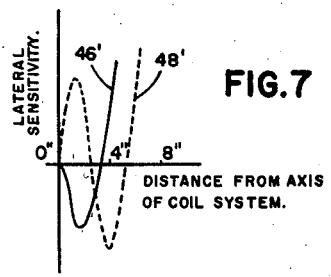

The lateral sensitivity characteristic for this arrangement of three two-coil systems is given by the solid curve 46 in Fig. 6. It can be seen from Fig. 6 that sensitivity to material in the vicinity of the coil system is greatly reduced. The determination of the contributions from different sections of surrounding relations are given by consideration of the geometrical factors as discussed in the above-mentioned article by H. G. Doll. Fig. 7 is an expansion of the lower left-hand corner of the plot shown in Fig. 6 where it can be seen that the very small contributions of the resultant signal to be expected are the product of the geometrical factor and the conductivity of the surrounding medium up to a radius of about 4 inches from the axis of the coil system.

Even this contribution can be substantially decreased by introducing a fourth two-coil system, arranged such that a positive and a negative loop of about equal areas occur for the lateral sensitivity as given by the dotted curve 48' of Fig. 7. Relation 5, however, would usually be inapplicable to this type of design procedure unless there are more than four two-coil systems. The contribution of conductive material is now negligible up to about a radius of six inches from the axis of the coil system when mounted upon the usual non-conductive mandrel.

The dotted curve 48' corresponds to the curve 48 of Fig. 6 for the lateral sensitivity characteristic. The corresponding longitudinal sensitivity characteristic is shown by curve 61 of Fig. 5. The data for this design of four two-coil systems has been determined as:

$R_1=T_1=100$ turns     $D_1=30''$
$R_2=T_2=91$ turns     $D_2=90''$
$R_3=T_3=42.6$ turns     $D_3=15''$
$R_4=T_4=10$ turns     $D_4=7.5''$ In this four two-coil system array, where Relation 5 does not hold, the responses of coil systems $R_2T_2$ and $R_3T_3$ are subtracted from the responses of coil systems $R_1T_1$ and $R_4T_4$. The condition that $f^2I$ is constant has been used.

It is evident from these illustrations that negligible response occurs from formations above and below the outermost coils, while a minimal response is obtained from the conductive borehole fluid. For boreholes that keep to gauge with a diameter less than about twelve inches, the signal from part of the invaded zone is even decreased. Accordingly, an excellent direct representation of the conductivity of the uncontaminated formation can be expected in such cases.

It will be further be understood that the principle of reciprocity applies, such that transmitter coils and receiver coils may be interchanged within each two-coil system without modifying the results obtained. Other modifications can be made within the spirit of the invention as will be apparent to those skilled in the art. Therefore, the embodiments that have been described above by way of illustration are not to be regarded as limiting the scope of the following claims.

I claim:

1. In apparatus for investigating the electrical conductivity of the earth formations traversed by a borehole, the combination of a plurality of coil systems adapted to be passed through said borehole, each coil system comprising a transmitter coil and a receiver coil, all of said coils being arranged coaxially and spaced vertically apart, the coils in each system being arranged symmetrically above and below a given point, means for energizing each transmitter coil with alternating current having a distinguishable characteristic, the areas of said coils and said alternating current being selected so as substantially to satisfy the relation $$\sum_n S_n S_n' f_n^2 I_n = 0$$

where $S_n$ is the area of the $n$th transmitter coil, $S_n'$ is the area of the $n$th receiver coil, and $f_n$ is the frequency and $I_n$ the intensity of the alternating current passed through the $n$th transmitter coil, means for detecting the conductive signal from each receiver coil due to the alternating current flowing through the corresponding transmitter coil, and means for combining said conductive signals.

2. Apparatus as in claim 1, where said plurality of coil systems comprises at least three coil systems, the areas and spacings of said coils and said alternating current being selected so as substantially to satisfy the relation $$\sum_n \frac{S_n S_n' f_n^2 I_n}{D_n^3} = 0$$

where $D_n$ is one-half the distance between the coils in the $n$th coil system.

3. In apparatus for investigating the electrical conductivity of the earth formations traversed by a borehole, the combination of a plurality of coil systems adapted to be passed through said borehole, each coil system comprising a transmitter coil and a receiver coil, all of said coils being arranged coaxially and spaced vertically apart, the coils in each system being arranged symmetrically above and below a given point, means for energizing each transmitter coil with alternating current of respectively different frequency, the areas of said coils and said alternating current being selected so as substantially to satisfy the relation $$\sum_n S_n S_n' f_n^2 I_n = 0$$

where $S_n$ is the area of the $n$th transmitter coils, $S_n'$ is the area of the $n$th receiver coil, and $f_n$ is the frequency and $I_n$ the intensity of the alternating current passed through the $n$th transmitter coil, means for detecting the conductive signal from each receiver coil having the same frequency as the alternating current energizing the corresponding transmitter coil, and means for combining said conductive signals.

4. In apparatus for investigating the electrical conductivity of the earth formations traversed by a borehole, the combination of a plurality of coil systems adapted to be passed through said borehole, each coil system comprising a transmitter coil and a receiver coil, all of said coils being arranged coaxially and spaced vertically apart, the coils in each system being arranged symmetrically above and below a given point, means for energizing said transmitter coils in sequence with alternating current of predetermined frequency, the areas of said coils and said alternating current being selected so as substantially to satisfy the relation $$\sum_n S_n S_n' I_n = 0$$

where $S_n$ is the area of the $n$th transmitter coil, $S_n'$ is the area of the $n$th receiver coil, and $I_n$ is the intensity of the alternating current passed through the $n$th transmitter coil, means for detecting the conductive signal from each receiver coil during the intervals when the corresponding transmitter coil is energized, and means for combining said conductive signals.

5. In apparatus for investigating the electrical conductivity of the earth formations traversed by a borehole, the combination of a plurality of coil systems adapted to be passed through said borehole, each coil system comprising a transmitter coil and a receiver coil, all of said coils being arranged coaxially and spaced vertically apart and having the same diameters, the coils in each system being arranged symmetrically above and below a given point, means for energizing each transmitter coil with alternating current having a distinguishable characteristic, such that the product of the frequency squared and current intensity through each transmitter coil is substantially equal to the product of the frequency squared and current intensity through all other transmitter coils, the number of turns of said coils being selected so as substantially to satisfy the relation $$\sum_n N_n N_n' = 0$$

where $N_n$ is the number of turns of the $n$th transmitter coil and $N_n'$ is the number of turns of the $n$th receiver coil, means for detecting the conductive signal from each receiver coil due to the alternating current flowing through the corresponding transmitter coil, and means for combining said conductive signals.

6. Apparatus as in claim 5, where said plurality of coil systems comprises at least three coil systems, the turns and spacings of said coils being selected so as substantially to satisfy the relation $$\sum_n \frac{N_n N_n'}{D_n^3} = 0$$

where $D_n$ is one half the distance between coils in the $n$th coil system.

7. In apparatus for investigating the electrical conductivity of the earth formations traversed by a borehole, the combination of first and second coil systems adapted to be passed through said borehole, each coil system comprising a transmitter coil and a receiver coil, the coils in said first and second systems being arranged coaxially and spaced vertically apart, the coils in said second system being arranged symmetrically above and below said first coil system, means for energizing each transmitter coil with alternating current having a distinguishable characteristic, the areas of said coils and said alternating current being selected so as substantially to satisfy the relation $$S_1 S_1' f_1^2 I_1 = S_2 S_2' f_2^2 I_2$$

where $S_1$ and $S_2$ are the areas of the first and second transmitter coils respectively, $S_1'$ and $S_2'$ are the areas of the first and second receiver coils respectively, $f_1$ and $I_1$ are the frequency and intensity respectively of the current passing through the first transmitter coil, and $f_2$ and $I_2$ are the frequency and intensity respectively of the current passing through the second transmitter coil, means for detecting a first conductive signal in the output of said first receiver coil due to the alternating current flowing through said first transmitter coil, means for detecting a second conductive signal in the output of said second receiver coil due to the alternating current flowing through said second transmitter coil, and means for subtracting said second signal from said first signal.

8. In apparatus for investigating the electrical conductivity of the earth formations traversed by a borehole, the combination of first and second coil systems adapted to be passed through said borehole, each coil system comprising a transmitter coil and a receiver coil, the coils in said first and second systems being arranged coaxially and spaced vertically apart and having substantially the same diameters, the coils in said second system being arranged symmetrically above and below said first coil system, means for energizing each transmitter coil with alternating current having a distinguishable characteristic, the product of the frequency squared and current intensity through said first transmitter coil being substantially equal to the product of the frequency squared and current intensity through said second transmitter coil, the turns of said coils being selected so as substantially to satisfy the relation $$N_1 N_1' = N_2 N_2'$$

where $N_1$ and $N_2$ are the turns of the first and second transmitter coils respectively, and $N_1'$ and $N_2'$ are the turns of the first and second receiver coils respectively, means for detecting a first conductive signal in the output of said first receiver coil due to the alternating current flowing through said first transmitter coil, means for detecting a second conductive signal in the output of said second receiver coil due to the alternating current flowing through said second transmitter coil, and means for subtracting said second signal from said first signal.

No references cited.